(12) United States Patent
Vorhies et al.

(10) Patent No.: US 12,561,413 B2
(45) Date of Patent: Feb. 24, 2026

(54) SYSTEMS AND METHODS FOR USE IN VERIFYING IDENTITIES OF USERS TO PROVIDE SECURE REAL-WORLD MEETUP

(71) Applicant: MASTERCARD INTERNATIONAL INCORPORATED, Purchase, NY (US)

(72) Inventors: David Vorhies, St. Charles, MO (US); Shawn Mehrhoff, St. Ann, MO (US); Dakota Korzenewski, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 244 days.

(21) Appl. No.: 18/217,097

(22) Filed: Jun. 30, 2023

(65) Prior Publication Data

US 2025/0005118 A1      Jan. 2, 2025

(51) Int. Cl.
G06F 21/31          (2013.01)

(52) U.S. Cl.
CPC ..................................... G06F 21/31 (2013.01)

(58) Field of Classification Search
CPC ...................................................... G06F 21/31
See application file for complete search history.

(56) References Cited

U.S. PATENT DOCUMENTS

| | | | |
|---|---|---|---|
| 10,212,542 B2 | 2/2019 | Sophinos et al. | |
| 10,423,834 B2 * | 9/2019 | Badalamenti | .......... H04B 17/27 |

| | | | |
|---|---|---|---|
| 11,625,654 B1 * | 4/2023 | Davis | ............... G06Q 10/06311 |
| | | | 705/7.13 |
| 11,716,616 B2 * | 8/2023 | Akpinar | ............. G01C 21/3632 |
| | | | 726/10 |
| 2017/0006008 A1 | 1/2017 | Moran et al. | |
| 2018/0288033 A1 | 10/2018 | Kamal | |
| 2019/0089702 A1 | 3/2019 | Bhatt et al. | |
| 2019/0096021 A1 * | 3/2019 | Jarvis | .................. G07F 17/0057 |

(Continued)

OTHER PUBLICATIONS

"Online Safety Verification System"; https://www.about.dateid.com/get-meetup-id; 22 pgs. Web accessed Sep. 7, 2022.

*Primary Examiner* — James R Turchen
(74) *Attorney, Agent, or Firm* — Harness, Dickey & Pierce, P.L.C.

(57) ABSTRACT

Systems and methods are provided for verifying identities of users in connection with a secure meetup. One example computer-implemented method includes receiving meetup details from a first user for a real-world meetup with a second user, where the meetup details include a location of the meetup and an identity attribute(s) of the second user, and compiling and storing a meetup packet for the meetup details. The method then includes determining that a communication device of the first user is within a geofence of the location and, in response: authenticating the first user and sharing an identity attribute(s) of the first user with a second communication device of the second user. The method further includes receiving the identity attribute(s) specific to the second user from the second communication device, comparing the received identity attribute(s) to the meetup packet, and, based on a mismatch therebetween, indicating a warning to the first user.

18 Claims, 3 Drawing Sheets

(56) References Cited

U.S. PATENT DOCUMENTS

| | | | |
|---|---|---|---|
| 2019/0228491 A1* | 7/2019 | Padiadpu Subramanya Bhat ....... | H04L 63/126 |
| 2019/0286928 A1* | 9/2019 | Hubschman ........... | G06V 10/96 |
| 2019/0342096 A1* | 11/2019 | Starosielsky ....... | H04L 63/0428 |
| 2019/0379999 A1 | 12/2019 | Kreji | |
| 2020/0005557 A1* | 1/2020 | Madaan ................. | G06Q 50/40 |
| 2020/0351619 A1* | 11/2020 | Schock ................. | H04L 63/083 |
| 2021/0099454 A1* | 4/2021 | Rahimi .................. | G06F 21/31 |
| 2024/0176832 A1* | 5/2024 | Bright ................. | G06F 16/9535 |
| 2025/0080526 A1* | 3/2025 | Anderson ............. | H04L 63/083 |

* cited by examiner

SYSTEMS AND METHODS FOR USE IN VERIFYING IDENTITIES OF USERS TO PROVIDE SECURE REAL-WORLD MEETUP

FIELD

The present disclosure is generally directed to systems and methods for use in data security, and in particular, to systems and methods for use in verifying identities of users in connection with secure meetup interactions.

BACKGROUND

This section provides background information related to the present disclosure which is not necessarily prior art.

Identities of users are often required to be verified in order for the users to interact with different entities. For example, financial institutions typically require the identities of users to be verified prior to conducting business interactions with the users. A degree of verification of the users is often determined by, or is often based on, the type of interactions involved. While financial business interactions may require particular verifications, other interactions, such as, for example, social media interactions, may require lesser or no verification of identities of users.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Users are often associated with identities, to which users are verified in connection with certain activities. For other activities, especially related to virtual interactions, opportunities to verify the identities of the users involved may be limited. Where users meet, virtually, through social network interactions, the users may rely on the social network platforms for verification of the identities of the users. Otherwise, users may be required to meet in person to verify their identities to other users of the interactions, through more conventional means, such as, for example, photo IDs (e.g., driver's licenses, passports, etc.). It is generally unadvisable to share location data, or other details, in virtual settings, to meet in person or otherwise to connect in the real world. As such, it is problematic to transition from virtual interactions to real world interactions to facilitate such verification, where there is confidence in the identities of the users interacting.

Uniquely, the systems and methods herein permit for verifying identities of users in connection with secure physical (i.e., real-world) meetup, based on prior virtual relationships/interactions.

Figure 1:
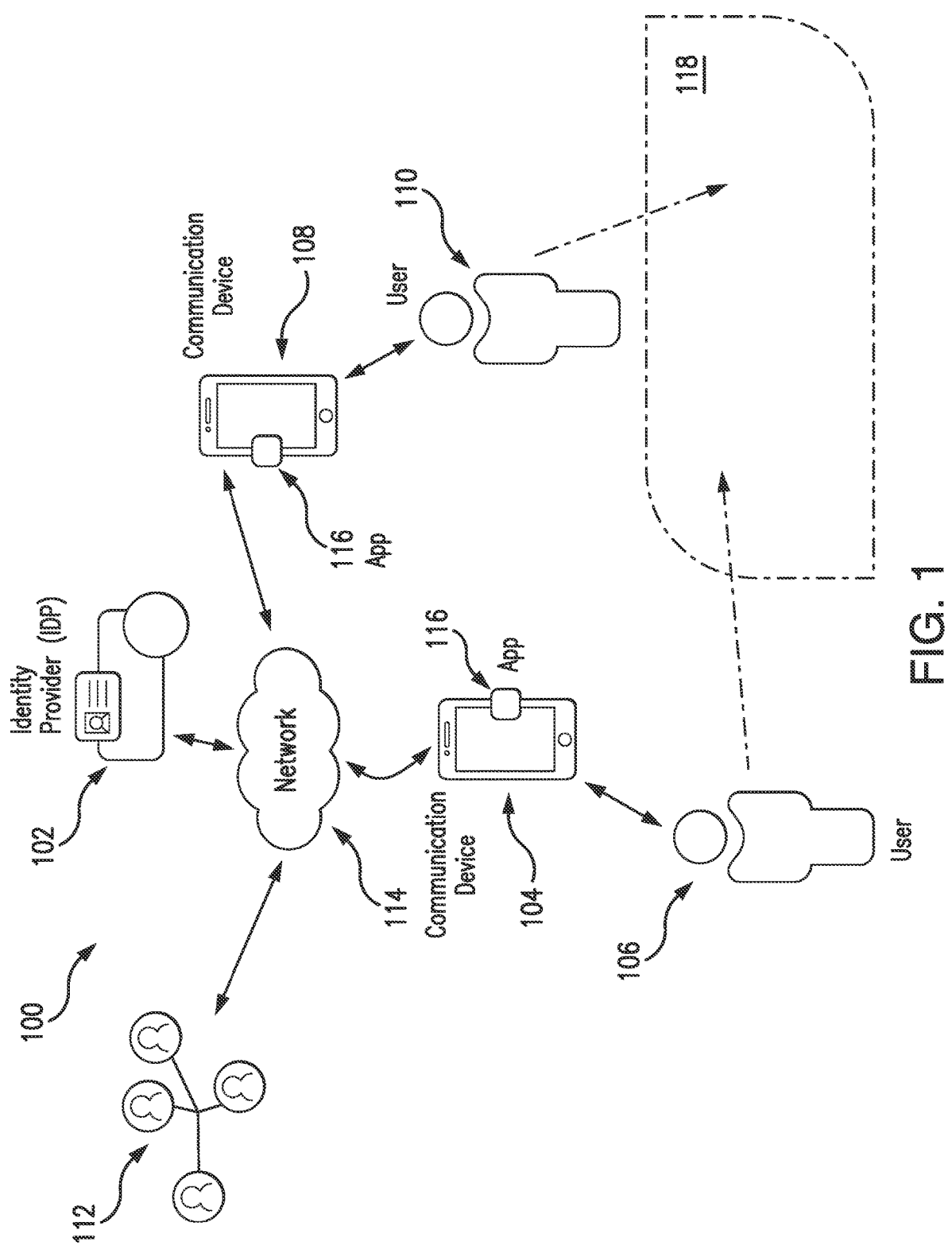
FIG. 1 illustrates an example system of the present disclosure suitable for use in verifying identities of users in connection with secure meetups.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users, platforms for identity services, privacy concerns and/or requirements, etc.

The illustrated system 100 generally includes an identity provider (IDP) 102, a first communication device 104 associated with a first user 106, a second communication device 108 associated with a second user 110, and a social network platform 112, each of which is coupled to network 114. The network 114 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 114 may include multiple different networks, where one or more of the multiple different networks may then be accessible to particular ones of the IDP 102, the communication devices 104 and 108, and/or the social network platform 112.

The IDP 102 in the system 100 generally is associated with forming and/or managing digital identities associated with users (e.g., the user 106, the user 110, etc.). In connection therewith, the IDP 102 is configured to participate in registering, provisioning, and storing (in secure memory) identity information (or attributes) associated with the users. As such, the IDP 102 is configured to employ various techniques to verify identifying information in connection with registering the users, as described further below.

The communication devices 104 and 108 in the illustrated system 100 each include a portable communication device such as, for example, a tablet, a smartphone, a personal computer, etc. What's more, each of the communication devices 104 and 108 also includes a network-based application 116, which is provided, published, or offered by the IDP 102. The application 116 is configured to enable the communication devices 104 and 108 to perform, allow, facilitate, etc. operations/function described herein. In the illustrated embodiment, the application 116 may be a standalone application, or the application 116 may be provided as a software development kit (SDK) for integration in another application with one or more different purposes (e.g., as part of a financial application, an email application, a social-network application, a telecommunication application, a health application, etc.), etc.

In addition, the user 106 is linked to a specific identity, and the user 110 is linked to a different specific identity. The identities may each include, without limitation, one or more of a name, a pseudonym, a mailing address, a billing address, a government ID number, an email address, a phone number, a birthdate, a place of birth, biometric references (e.g., facial images, etc.), gender, age, eye color, height, weight, hair color, account number(s), insurance identifier(s), an employee identifier, and/or other information (broadly, attributes) sufficient to distinguish the users 106 and 110 from one another, and also from other users, etc.

In this example embodiment, the users 106, 110 signup or register their identities with the application 116. In particular, when the user 106, for example, launches the application 116 in the communication device 104, the communication device 104 is configured, by the application 116, to solicit identifying information from the user 106. The identifying information may include any of the attributes above, but generally, includes a name, an address, a phone number, etc. Other attributes may be solicited, as well, as desired. In response, the user 106 enters the attributes (e.g., through on or more interfaces at the communication device 104, etc.).

In addition, the communication device 104 is configured, by the application 116, to solicit an image of the user 106 (e.g., a selfie, a fingerprint, etc.) and also an image of a physical document, which evidences the identity of the user 106 (e.g., a driver's licenses, a government issued card or document (e.g., a birth certificate, a passport, etc.), a utility bill, etc.). In response, the user 106 presents his/her face, etc., to a camera input device of the communication device 104, and then, also the physical document. The communication device 104 is configured, by the application, to capture an image of the user 106 and the physical document, one after the other. Next, the communication device 104 is configured, by the application 116, to extract an image of the user 106 or other biometric from the captured image of the physical document and to compare the extracted image from the physical document to the captured biometric of the user 106.

When there is no match, the communication device 104 is configured, by the application 116, to issue an error. Conversely, when there is a match, the communication device 104 is configured, by the application 116, further to extract one or more attributes from the image of the physical document and to compare the extracted attribute(s) to the attribute(s) provided by the user 106 to the communication device 108. Again, when there is no match, the communication device 104 is configured, by the application 116, to issue an error. Conversely, when there is a match, the communication device 104 is configured, by the application 116, to store the extracted attribute(s) as part of an identity of the user 106 in the memory of the communication device 104 (e.g., in a trusted execution environment (TEE) of the communication device 104, etc.). It should be appreciated that the communication device 104 may be configured to interact with the IDP 102 to verify the attribute(s), for example, through government databases, financial records, etc., in addition to, or in lieu of, the verification at the communication device 104. The IDP 102 may be configured to return verification of the attribute(s), which may then be stored as part of an identity of the user 106 in the memory of the communication device 104 (e.g., in a TEE of the communication device 104, etc.). In this way, the identity of the user 106 is provisioned to the communication device 108.

As part of the provisioning, the communication device 104 is configured, by the application 116, to communicate the provisioning, and potentially, attributes thereof, to the IDP 102. The IDP 102, in turn, is further configured to generate a profile for the user 106, which is associated with a unique identifier, and to store the profile in memory thereof. In connection therewith, the IDP 102 may store any attributes received from the communication device 104 for the user 106 in memory in association with the profile.

It should be appreciated that the identity of the user 110 is similarly provisioned to the communication device 108.

In this example embodiment, the social network platform 112 is configured to host, enable and/or allow for virtual correspondence and/or communication between different users, such as, for example, the user 106 and the user 110. Examples of social network platforms may include, for example, FACEBOOK, TWITTER, LINKEDIN, INSTAGRAM, and PINTEREST platforms, etc., which are targeted for social interaction, and may also include dating platforms, commerce platforms, etc., or other platform that enable user-to-user virtual communication.

In connection therewith, the user 106, for example, may access the social network platform 112 and register with certain information before being able to communicate with other users. In general, the user 106 is associated with a unique username or handle or screen name specific to the user 106, and an email address. The user 106 may enter additional information, such as, for example, a name, phone number, preferences, etc., in some registration process. As part of registering the user 106, in this example, the social network platform 112 is configured to verify the email address of the user 106. In particular, the social network platform 112 is configured to transmit a passcode/password (e.g., a one-time or single-use code, etc.) to the email address and to request the user 106 to enter the same in order to register. The social network platform 112 is configured to complete registering the user 106 when the passcode/password form the user 106 matches the passcode/password emailed to the user 106. Once registration is complete, the social network platform 112 is configured to host, enable and/or allow the user 106 to virtually correspondence and/or communication with other users.

As above, it should be appreciated that the social network platform 112 is configured to similarly register the user 110.

It should also be understood that the social network platform 112 may not be configured to verify any other information about the users thereof (e.g., the user 106, the user 110, etc.). As such, users may include fictious names, or only partial names, etc., which is viewable by other users.

While only two communication devices 104 and 108, two users 106 and 110, and one social network platform 112 are illustrated in the system 100, it should be appreciated that additional ones of these parts/parties may be included in other system embodiments. Specifically, for example, it should be appreciated that other system embodiments may include numerous users and associated communication device and/or a number of other social network platforms, etc.

Figure 2:
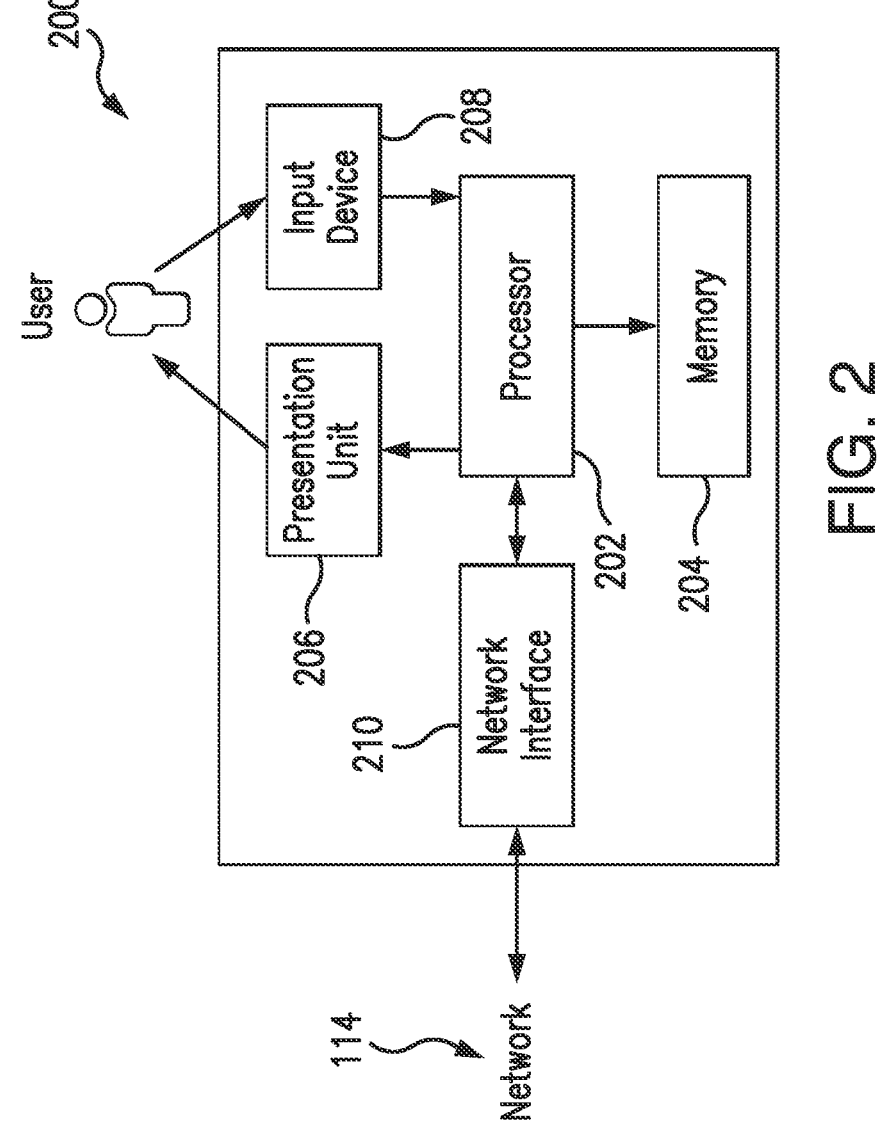
FIG. 2 is a block diagram of a computing device that may be used in the example system of FIG. 1.

FIG. 2 illustrates an example computing device 200 that may be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the IDP 102, the communication devices 104 and 108, and the social network platform 112 may be considered, may include, and/or may be implemented in a computing device consistent with the computing device 200, coupled to (and in communication with) the network 114. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data (broadly, attributes) related to identities of users, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to capture an image of a document, etc.), etc. And, various interfaces (e.g., as defined by the application 116, etc.) (e.g., interface 400, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, selection of a user, input to capture an image, etc., based on one or more interfaces, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a BLUETOOTH adapter, etc.), a mobile network adapter, or other device capable of communicating to one or more different networks herein (e.g., network 114, etc.) and/or with other devices described herein. Further, in some example embodiments, the computing device 200 may include the processor 202 and one or more network interfaces incorporated into or with the processor 202.

Referring again to FIG. 1, the user 106 may interact with the user 110, through the social network platform 112, whereby the user 106 may decide to meet in the real world, i.e., beyond or apart from the virtual correspondence and/or communication. The user 110 may then agree to meet in the real world. In connection therewith, or prior thereto, the users 106 and 110 may exchange certain information, such as, for example, names, ages, selfies, etc. Once a decision to meet is agreed, the users 106, 110, share a location, time and date of the real world meetup.

In this example embodiment, the user 106 accesses the application 116 at the communication device 104 and selects a real world meetup option. The user 106 identifies the user 110 by name, height, gender, age, eye color, etc., and also a specific identifier, such as, for example, a mobile phone number, email address, or unique identifier (e.g., as provided through or obtained through the interaction of the user 106 with the user 110 at the social network platform 112, etc.). The user 106 also enters a location, time and date of the meetup. The user 110 likewise enters the above information to a meetup option in the application 116 of the communication device 108.

In response, the communication devices 104, 108 are each configured, by the applications 116, to generate and store a meetup packet for the meetup, which includes the data identified by the users 106, 110 (e.g., name, height, gender, age, eye color, and location, time and date of the meetup, etc.). This may be done any desired time prior to the time and date of the real world meetup.

On the day of the meetup, the user 106 navigates to the location of the meetup. When the user 106 approaches the location, the communication device 104 is configured, by the application 116, to determine that the user 106 is within a predefined distance of the location (e.g., one mile, 500 yards, etc.) (or within a geofence around the location) (e.g., example location 118 indicated by the dotted box in FIG. 1, etc.) and, based on such determination, is configured to authenticate the user 106 (e.g., in advance of the actual meetup, in advance of the time of the meetup, etc.). In addition, in some examples, a time that the user 106 is within the predefined distance of the location must also be within a threshold time of the time of the meetup (e.g., within one hour, within thirty minutes, within fifteen minutes, etc.).

In particular, to authenticate the user 106, the communication device 104 is configured, by the application 116, to solicit a selfie or other biometric from the user 106, which, in turn, presents the biometric to the communication device 104. The communication device 104 is configured, by the application 116, to perform a liveness check, to capture the biometric, and (when the liveness check is confirmed) to compare the biometric to a reference biometric in the identity provisioned to the communication device 104. It should be appreciated that the compare may be performed at the communication device 104, or alternatively, the communication device 104 may be configured, by the application 116, to communicate the biometric to the IDP 102, whereby the IPD 102 is configured to compare the biometric to a stored reference biometric and revert with a result. When there is a match, the user 106 is authenticated, and the communication device 104 is configured, by the application 116, to identify the communication device 108 based on the meetup packet and to pass one or more permitted attributes (e.g., name, height, gender, age, eye color, etc.) to the communication device 108 (e.g., via network 114, etc.). That said, the attribute(s) passed to the communication device 108 may include attributes stored in memory of the communication device 104 (and confirmed by the user 106), or they may include an attribute(s) previously obtained by the communication device 104 from the IDP 102 (and confirmed by the user 106 once received by the communication device 104, etc.).

Upon receipt, the communication device 108 is configured, by the application 116, to verify the received attribute related to the user 106 against (or to) the data included in the meetup packet.

At or around the same time, the user 110 navigates to the location of the meetup. When the user 110 approaches the location, the communication device 108 is configured, by the application 116, to determine that the user 110 is within a predefined distance of the location (e.g., one mile, 500 yards, etc.) (or within a geofence around the locations) and, based on such determination, is configured to authenticate the user 110 (on the communication device 108, or via the IDP 102). In addition, in some examples, a time that the user 110 is within the predefined distance of the location must also be within a threshold time of the time of the meetup (e.g., within one hour, within thirty minutes, within fifteen minutes, etc.). When authenticated (e.g., in the manner described above, etc.), the communication device 108 is configured, by the application 116, to likewise pass one or more permitted attributes (e.g., name, height, gender, age, eye color, etc.) to the communication device 104 (e.g., via network 114, etc.). Again, the attribute(s) passed to the communication device 104 may include attributes stored in memory of the communication device 108 (and confirmed by the user 110), or they may include an attribute(s) previously obtained by the communication device 108 from the IDP 102 (and confirmed by the user 110 once received by the communication device 108, etc.).

Upon receipt, the communication device 104 is configured, by the application 116, to verify the received attribute related to the user 112 against (or to) the data included in the meetup packet.

When there is a match between the attributes received from the communication device 108 and the meetup packet, and the user 110 is authenticated, the communication device 104 is configured, by the application 116, to indicate to the user 106 that the user 110 is present or nearby and verified. Similarly, when there is a match between the attributes received from the communication device 104 and the meetup packet, and the user 106 is authenticated, the communication device 104 is configured, by the application 116, to indicate to the user 110 that the user 106 is present or nearby and verified.

In connection therewith, the communication devices 104, 108 may be configured, by the applications 116, to display attributes of the other users, to communicate a location to the other communication device, and/or to provide navigational instruction to the other communication device, etc. In addition, the communication devices 104, 112 may be configured, by the applications 116, to each generate a record of the meetup, the verification, etc. and store the meetup record therein.

Conversely, when the attributes received from the communication device 108, for example, do not match the meetup packet, the communication device 104 may be configured, by the application 116, to issue a warning to the user 106 or otherwise inform the user 106 that the other user is not verified. The communication device 108 is likewise configured.

Figure 3:
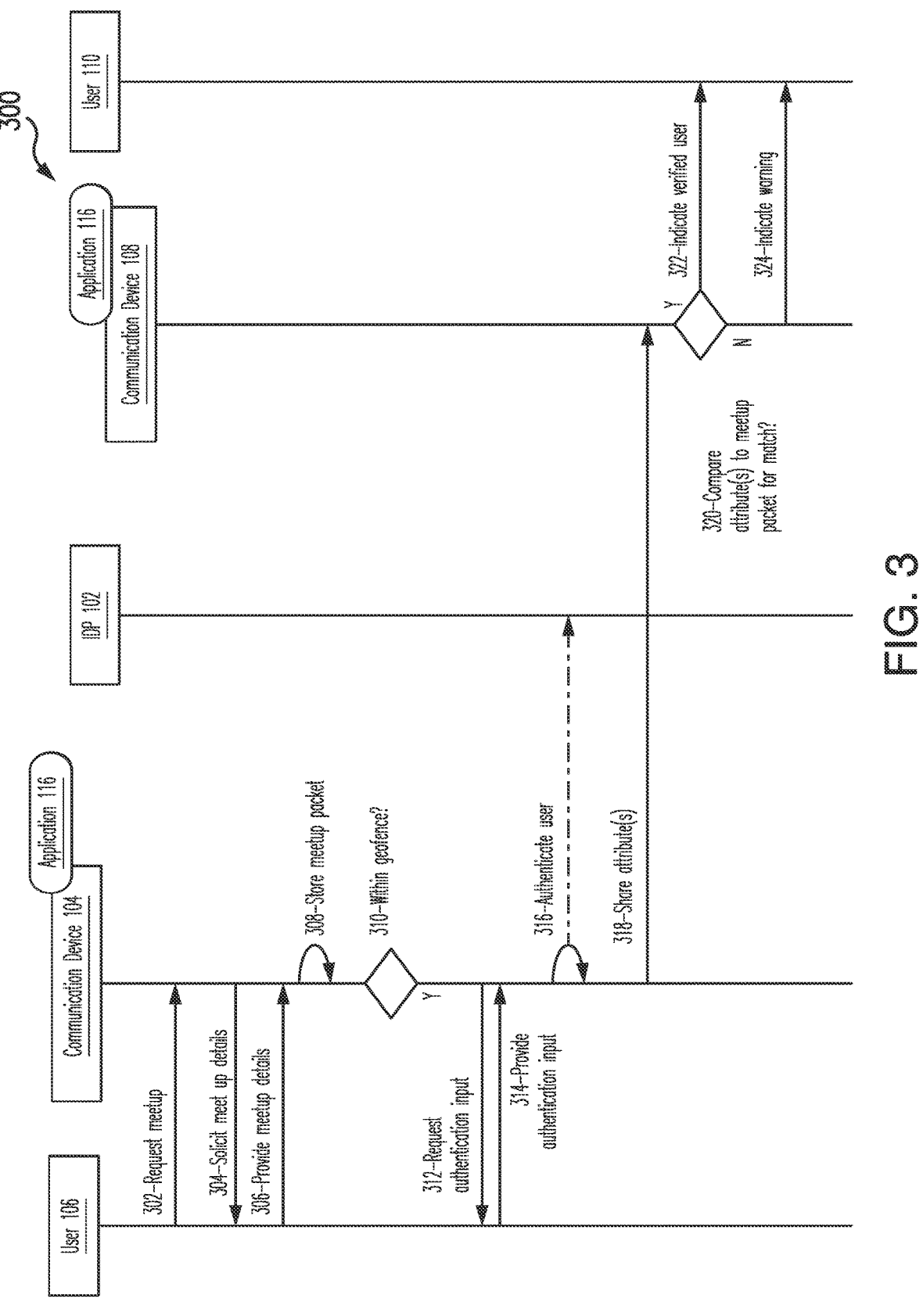
FIG. 3 illustrates an example method, which may be implemented in connection with the system of FIG. 1, for verifying identities of users in connection with a secure meetup.

FIG. 3 illustrates an example method 300 for use in verifying identities of users in connection with a secure meetup. The example method 300 is described as implemented in system 100, with reference to the IDP 102, the communication devices 104 and 108, and the application 116, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

At the outset, it should be understood that the communication device 104 includes a provisioned identity of the user 106 and that the communication device 108 includes a provisioned identity of the user 110. Each identity is provisioned to the respective communication device through a process consistent with or similar to that described above. Additionally, the user 106 and the user 110 have a virtual connection, through the social network platform 112, and have decided to meetup in the real world.

In connection therewith, at 302, the user 106 requests a meetup option in the application 116 of the communication device 104. In response, at 304, the communication device 104 solicits one or more meetup details from the user 106. The meetup details may include name, height, gender, age, or other detail about the user 110, etc. (e.g., as obtained through interaction with the user 110 at the social network platform 112, etc.), and which may be indicative of the identity of the user 110, etc. The meetup details also include a time and location of the meetup. The meetup detail may also include a designation of the attributes to be shared with the user 110. At 306, the user 106 provides the meetup details to the communication device 104.

At 308, the communication device 104 compiles and stores (e.g., in memory 204 of the communication device 104, etc.) a meetup packet for the meetup. The meetup packet includes the meetup details provided by the user 106 (including the detail about the user 110). In addition, in some example embodiments, the communication device 104 may transmit the meetup packet to the IDP 102 or other provider, where the IDP 102 or other provide may store the meetup packet in an audit log for future reference, etc.

At 310, the communication device 104 determines that the communication device 104 is within a geofence of the meetup location (e.g., location 118 in FIG. 1, etc.). In particular, the communication device 104 determines its location continually, or at one or more regular or irregular intervals, in general or at or around the time of the meetup (e.g., via GPS, via cellular towers, etc.). The communication device 104 then determines the location is within the geofence, which may be a defined area, in general or based on predefined distance of the location in the meetup packet. In addition, the communication device 104 may determine that a current time is within a threshold of the time of the meetup.

When the communication device 104 is within the geofence (and, in some examples, at a time within the threshold of the time of the meetup), as illustrated in FIG. 3, the communication device 104 requests, at 312, an authentication input from the user 106. The authentication input may be, for example, a selfie of the user's face, etc., or other biometric, or potentially, other data, which is verifiable against the identity of the user 106. The request may be included in an interface displayed by the communication device 104 and/or an audible or visual instruction from the communication device 104. In response, at 314, the user 106 provides the requested authentication input to the communication device 104.

Next, at 316, the communication device 104 authenticates the user 106. This may include comparing the authentication input to the identity provisioned to the communication device 104. For example, a selfie may be compared to a reference image included in the provisioned identity (e.g., from a physical document, or an image from registration of the user 106, etc.). Additionally, or alternatively, the communication device 104 may interact with the IDP 102, as indicated by the dotted line, to authenticate the user 106. This may include transmitting the authentication input from the user 106 to the IDP 102, whereby the IDP 102 compares the authentication input to an identity registered to the communication device 104 (e.g., based on a phone number, email address or unique identifier, etc. transmitted with the authentication input). In this scenario, the IDP 102 then provides a result (e.g., user authenticated, or user not authenticated, etc.) back to the communication device 104.

In either case, in this example, when authentication fails, the method 300 ends. That said, it should be appreciated that in some example embodiments, the communication device 104 may still be able to access the meetup packet, and identify and share one or more identity attributes therefrom (for the user 106) with the communication device 108 authenticating the user 106 or even without the communication device 108 successfully authenticating the user 106 (e.g., where the user 106 did not select/determine the meetup location (e.g., where a third party or service picked the meetup location, etc.), etc.).

However, when the authentication is successful, the communication device 104 identifies the communication device 108 from the meetup packet and shares, at 318, one or more identity attributes of the user 106 (from the provisioned identity) with the communication device 108.

While the method 300 is described primarily with reference to the communication device 104 and the user 106, and initiation of the meetup thereby, it should be understood to be equally applicable to initiation by the communication device 108 and the user 110, etc. As such, the communication device 108 may similarly compile and stored a meetup packet, at 308, consistent with the description above.

With continued reference to FIG. 3, at 320, the communication device 108 compares the identity attributes received from the communication device 104 to the meetup packet stored therein for the meetup. When there is a match, the communication device 108 indicates, at 322, that the user 106 is a verified user to the user 110. The user 110 may then proceed to the location to meetup with the verified user 106. Conversely, at 324, when there is no match, the communication device 108 indicates a warning to the user 110 that the user 106 could not be, or was not, verified. In addition, the communication device 108 may transmit an alert to one or more support structures to request assistance for the user 110 (e.g., based on a level of discomfort for the user 110 regarding the pending meetup, etc.) and/or to request best practices for exiting the meetup situation, etc.

In some example embodiments, an outcome of the comparison (e.g., match or no match, etc.) may be transmitted to the IDP 102 or other database for recording a trust value for the user 110 (e.g., for association with a profile of the user 110, etc.). In this way, a record may be provided for the user 110 as to trustworthiness, such that the user 110 may be removed from the meetup service if several non-matches are recorded in his/her profile.

Through the method 300, as applied to the communication device 108, the communication device 104 also receives one or more identity attributes from the communication device 108, whereby the user 110 may also be verified, and the user 106 notified of the verified user 110, or provided with a warning if the user 110 is not verified.

In view of the above, the systems and methods herein provide for secure real world meetup, based on verified identities of the users involved in the meetup. The secure real world meetup is enabled through provisioning of identities, based on physical documents, which are then leveraged in connection with the meetup based on the proximity of the users to a location of the meetup. In this manner, verified users are enabled to meetup with other users, based on virtual relationships in the real world, more safely, and potentially, with limited or reduced risk of the other user(s) being not who they say they are.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving meetup details from a first user for a real-world meetup with a second user, the meetup details include a location of the real-world meetup and one or more identity attributes specific to the second user; (b) compiling and storing a meetup packet based on the meetup details; (c) determining that the communication device is within a geofence of the location of the real-world meetup; (d) in response to determining that the communication device is within the geofence of the location of the real-world meetup: (i) authenticating the first user; and (ii) sharing one or more identity attributes specific to the first user with a second communication device identified in the meetup packet; (e) receiving the one or more identity attributes specific to the second user, from the second communication device; (f) comparing the one or more identity attributes specific to the second user, from the second communication device, to the meetup packet; and (g) based on a mismatch between the one or more identity attributes specific to the second user to the meetup packet, indicating a warning to the first user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in verifying identities of users to provide a secure real-world meetup, the method comprising:
    receiving, by a communication device configured by an application, meetup details from a first user for a real-world meetup with a second user, based on prior virtual interactions between the first user and the second user via a social network platform, the meetup details include a location of the real-world meetup and one or more identity attributes specific to the second user;
    compiling and storing, by the communication device, a meetup packet based on the meetup details; and then,
    determining, by the communication device, that the communication device is within a geofence of the location of the real-world meetup;
    determining, by the communication device, that a current time is within a threshold time of a time on a date included in the meetup packet;
    in response to determining that the communication device is within the geofence of the location of the real-world meetup and the current time is within the threshold time of the time in the meetup packet:
        authenticating, by the communication device, the first user;
        identifying, by the communication device, a second communication device based on the meetup packet; and
        sharing, by the communication device, one or more identity attributes, from a trusted execution environment (TEE) of the communication device, specific to the first user with the second communication device identified in the meetup packet;
    receiving the one or more identity attributes specific to the second user, from the second communication device;
    comparing the one or more identity attributes specific to the second user, from the second communication device, to the meetup packet; and
    based on a mismatch between the one or more identity attributes specific to the second user to the meetup packet, indicating a warning to the first user.

2. The computer-implemented method of claim 1, wherein the application is offered by an identity provider (IDP) and is independent of the social network platform; and
    wherein the application includes an option for the real-world meetup; and
    wherein the one or more identity attributes specific to the second user include a name of the second user.

3. The computer-implemented method of claim 2, wherein determining that the communication device is within the geofence of the location of the real-world meetup includes determining, based on the time and the date of the real-world meetup, the communication device is within the geofence of the location of the real-world meetup; and
    wherein the geofence is defined by the location of the real-world meetup and a radius.

4. The computer-implemented method of claim 1, wherein authenticating the first user includes:
    requesting an authentication input from the first user;
    receiving the authentication input from the first user; and submitting the authentication input to an identity provider, whereby the identity provider authenticates the first user based on a reference indicative of an identity of the first user.

5. The computer-implemented method of claim 4, wherein the authentication input includes a biometric.

6. The computer-implemented method of claim 1, wherein authenticating the first user included:

requesting an authentication input from the first user;

receiving the authentication input from the first user; and comparing the authentication input to a reference biometric included in an identity provisioned to the communication device.

7. A non-transitory computer-readable storage medium comprising an application including executable instructions, which when executed by at least one processor of a computing device, cause the at least one processor to:

receive meetup details from a first user for a real-world meetup with a second user, based on prior virtual interactions between the first user and the second user via a social network platform, the meetup details include a location of the real-world meetup and one or more identity attributes specific to the second user;

compile and store a meetup packet based on the meetup details; and then, determine that the computing device is within a geofence of the location of the real-world meetup;

determine that a current time is within a threshold time of a time on a date included in the meetup packet;

in response to determining that the computing device is within the geofence of the location of the real-world meetup and the current time is within the threshold time of the time in the meetup packet:

authenticate the first user;

identify a second communication device based on the meetup packet; and share one or more identity attributes, from a trusted execution environment (TEE) of the computing device, specific to the first user with the second communication device;

receive the one or more identity attributes specific to the second user, from the second communication device;

compare the one or more identity attributes specific to the second user, from the second communication device, to the meetup packet; and based on a mismatch between the one or more identity attributes specific to the second user to the meetup packet, indicate a warning to the first user.

8. The non-transitory computer-readable storage medium of claim 7, wherein the application is independent of the social network platform; and wherein the application includes an option for the real-world meetup; and wherein the one or more identity attributes specific to the second user include a name of the second user.

9. The non-transitory computer-readable storage medium of claim 7, wherein the executable instructions, when executed by the at least one processor in connection with determining that the communication device is within the geofence of the location of the real-world meetup, cause the at least one processor to determine, based on the time and the date of the real-world meetup, the communication device is within the geofence of the location of the real-world meetup; and wherein the geofence is defined by the location of the real-world meetup and a radius.

10. The non-transitory computer-readable storage medium of claim 7, wherein the executable instructions, when executed by the at least one processor in connection with authenticating the first user, cause the at least one processor to:

request an authentication input from the first user;

receive the authentication input from the first user; and submit the authentication input to an identity provider, whereby the identity provider authenticates the first user based on a reference indicative of an identity of the first user.

11. The non-transitory computer-readable storage medium of claim 10, wherein the authentication input includes a biometric.

12. The non-transitory computer-readable storage medium of claim 7, wherein the executable instructions, when executed by the at least one processor in connection with authenticating the first user, cause the at least one processor to:

request an authentication input from the first user;

receive the authentication input from the first user; and compare the authentication input to a reference biometric included in an identity provisioned to the communication device.

13. The non-transitory computer-readable storage medium of claim 7, wherein the executable instructions, when executed by the at least one processor, further cause the at least one processor to identify the second communication device based on the meetup packet, prior to sharing the one or more identity attributes specific to the first user with the second communication device.

14. A portable computing device for use in verifying identities of users to provide a secure real-world meetup, the portable computing device comprising:

at least one processor; and a memory storing executable instructions, which when executed by the at least one processor, cause the at least one processor to:

receive meetup details from a first user for a real-world meetup with a second user, based on prior virtual interactions between the first user and the second user via a social network platform, the meetup details include a location of the real-world meetup and one or more identity attributes specific to the second user;

compile and store a meetup packet based on the meetup details; and then, determine that the portable computing device is within a geofence of the location of the real-world meetup;

determine that a current time is within a threshold time of a time on a date included in the meetup packet;

in response to determining that the portable computing device is within the geofence of the location of the real-world meetup and the current time is within the threshold time of the time in the meetup packet:

authenticate the first user;

identify a second communication device based on the meetup packet; and share one or more identity attributes specific to the first user with the second communication device;

receive the one or more identity attributes, from a trusted execution environment (TEE) of the portable computing device, specific to the second user, from the second communication device;

compare the one or more identity attributes specific to the second user, from the second communication device, to the meetup packet; and based on a mismatch between the one or more identity attributes specific to the second user to the meetup packet, indicate a warning to the first user.

15. The portable computing device of claim 14, wherein the geofence is defined by the location of the real-world meetup and a radius.

16. The portable computing device of claim 14, wherein the executable instructions, when executed by the at least one processor in connection with authenticating the first user, cause the at least one processor to:

request an authentication input from the first user;

receive the authentication input from the first user; and submit the authentication input to an identity provider, whereby the identity provider authenticates the first user based on a reference indicative of an identity of the first user.

17. The portable computing device of claim 16, wherein the authentication input includes a biometric.

18. The portable computing device of claim 14, wherein the executable instructions, when executed by the at least one processor in connection with authenticating the first user, cause the at least one processor to:

request an authentication input from the first user;

receive the authentication input from the first user; and compare the authentication input to a reference biometric included in an identity provisioned to the communication device.

* * * * *